United States Patent
Ruh

(10) Patent No.: US 10,155,339 B2
(45) Date of Patent: Dec. 18, 2018

(54) APPARATUS FOR MANUFACTURING COIL SCREENS

(71) Applicant: KARL MAYER TEXTILMASCHINENFABRIK GmbH, Obertshausen (DE)

(72) Inventor: Michael Ruh, Muehlheim/Main (DE)

(73) Assignee: KARL MAYER TEXTILMASCHINENFABRIK GmbH, Obertshausen (DE)

( * ) Notice: Subject to any disclaimer, the term of this patent is extended or adjusted under 35 U.S.C. 154(b) by 153 days.

(21) Appl. No.: 14/793,073

(22) Filed: Jul. 7, 2015

(65) Prior Publication Data

US 2016/0016352 A1 Jan. 21, 2016

(30) Foreign Application Priority Data

Jul. 17, 2014 (EP) ..................... 14177388

(51) Int. Cl.
*B29C 53/80* (2006.01)
*B29C 53/32* (2006.01)
(Continued)

(52) U.S. Cl.
CPC .......... *B29C 53/8016* (2013.01); *B29C 53/32* (2013.01); *B29C 53/8041* (2013.01);
(Continued)

(58) Field of Classification Search
CPC ... B07B 1/4618; B07B 1/4672; B07B 1/4681; B29C 53/32; B29C 53/56; B29C 53/58; B29C 53/8016; B29C 53/8025; B29C 53/8041; B29L 2031/711; B29L 2031/73; B29L 2028/00; B29L 2031/14; B29D 28/00; D21F 1/0072; B21F 27/00; B21F 27/005; B21F 27/02; B21F 27/12; B21F 27/18; Y10T 29/49602; Y10T 29/49604;
(Continued)

(56) References Cited

U.S. PATENT DOCUMENTS

| | | | |
|---|---|---|---|
| 997,185 A | 7/1911 | Fasting | |
| 2,265,370 A * | 12/1941 | Hennessy | ................. B21F 3/00 140/71 C |

(Continued)

FOREIGN PATENT DOCUMENTS

| | | |
|---|---|---|
| CA | 2704525 | 5/2009 |
| CN | 200957408 | 10/2007 |

(Continued)

OTHER PUBLICATIONS

Translation of JP56153552A, generated May 10, 2017.*
(Continued)

*Primary Examiner* — Matthew P Travers
(74) *Attorney, Agent, or Firm* — Greenblum & Bernstein, P.L.C.

(57) ABSTRACT

Apparatus and method for manufacturing coil screens. The apparatus includes at least one winding device, arranged above a working surface, that is structured for producing coils; a depositing device structured and arranged to deposit the coils on the working surface; and a storage device arranged, with respect to a depositing direction of the coils, downstream from the at least one winding device.

22 Claims, 1 Drawing Sheet

(51) Int. Cl.
*D21F 1/00* (2006.01)
*B29L 31/00* (2006.01)

(52) U.S. Cl.
CPC .... *D21F 1/0072* (2013.01); *B29C 2053/8025* (2013.01); *B29L 2031/711* (2013.01)

(58) Field of Classification Search
CPC ......... B65H 51/20; B65H 51/22–51/26; B65H 59/36
See application file for complete search history.

(56) References Cited

U.S. PATENT DOCUMENTS

| | | | | |
|---|---|---|---|---|
| 3,345,702 A | * | 10/1967 | Miedler | B65H 51/20 19/159 R |
| 4,346,138 A | * | 8/1982 | Lefferts | B29C 53/12 162/348 |
| 4,362,776 A | | 12/1982 | Lefferts | |
| 4,459,733 A | * | 7/1984 | Bachmann | B21F 27/18 140/3 R |
| 4,696,852 A | * | 9/1987 | Lefferts | D21F 1/0072 139/383 AA |
| 2010/0287775 A1 | | 11/2010 | Bachmann | |
| 2013/0256447 A1 | * | 10/2013 | Tanigawa | B29C 53/602 242/419.1 |

FOREIGN PATENT DOCUMENTS

| | | | |
|---|---|---|---|
| CN | 101910510 | 12/2010 | |
| DE | 10 2007 052 594 | 7/2007 | |
| EP | 0 054 930 | 6/1982 | |
| GB | 2069016 A | * 8/1981 | ............ B65H 51/22 |
| JP | 56-153552 | 11/1981 | |
| JP | 2011-504146 | 2/2011 | |
| JP | 2012-131605 | 7/2012 | |
| WO | 2009/056250 | 5/2009 | |

OTHER PUBLICATIONS

Definition of Lever, Merriam-Webster, accessed Jan. 26, 2018, https://www.merriam-webster.com/dictionary/lever.*
Search Report in Chinese application CN 201410501255.6 dated Dec. 16, 2016.
European Search Report conducted in European Appln. No. 141 77 388.7-1710 (Dec. 8, 2014) (w/ English language translation).
Korean Office Action (and Translation) in KR 10-2015-0097820 dated Aug. 1, 2016 (9 pages).
Canadian Office Action in CA 2,896,001 dated Jun. 28, 2016 (4 pages).
Japanese Office Action in JP 2015-142241 dated Jun. 14, 2016.
Search Report and Office Action (with Translation) in Chinese application CN 2014105012556 dated Nov. 2017 (11 pages).

* cited by examiner

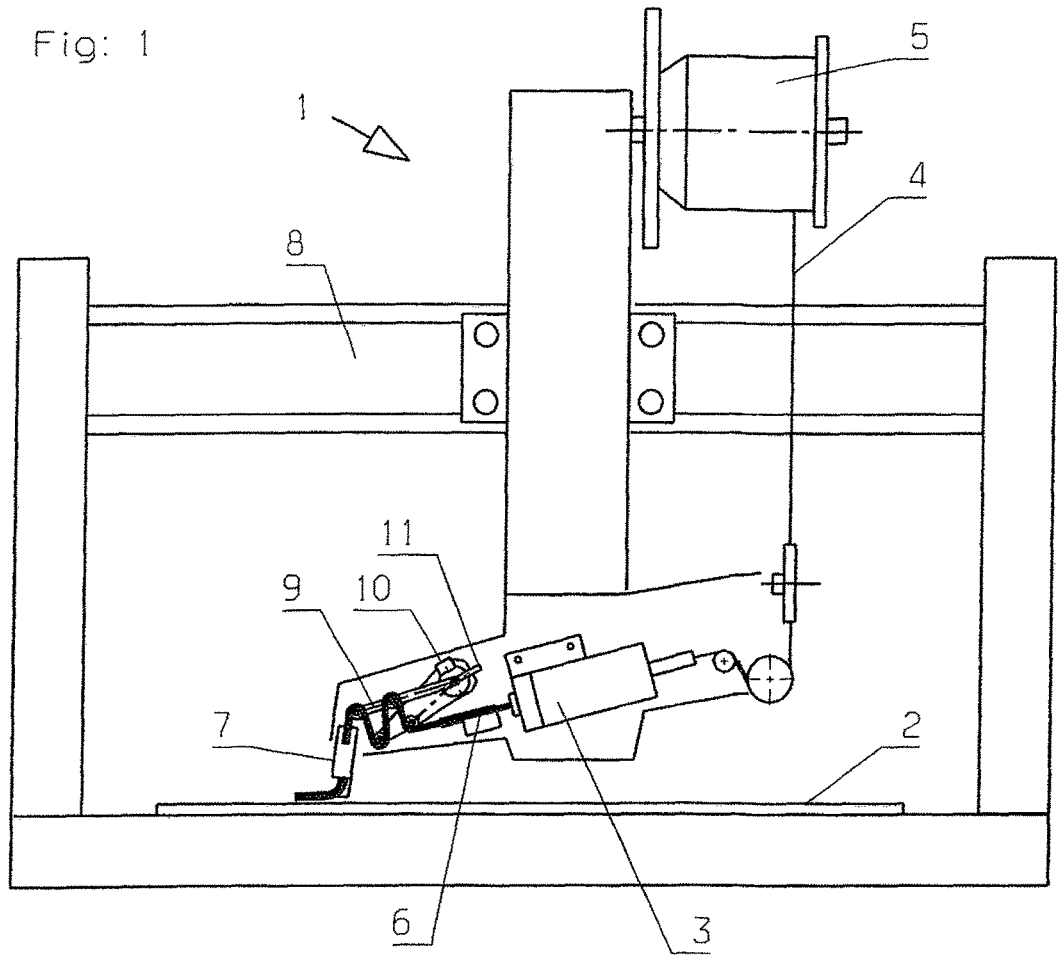
Fig: 1
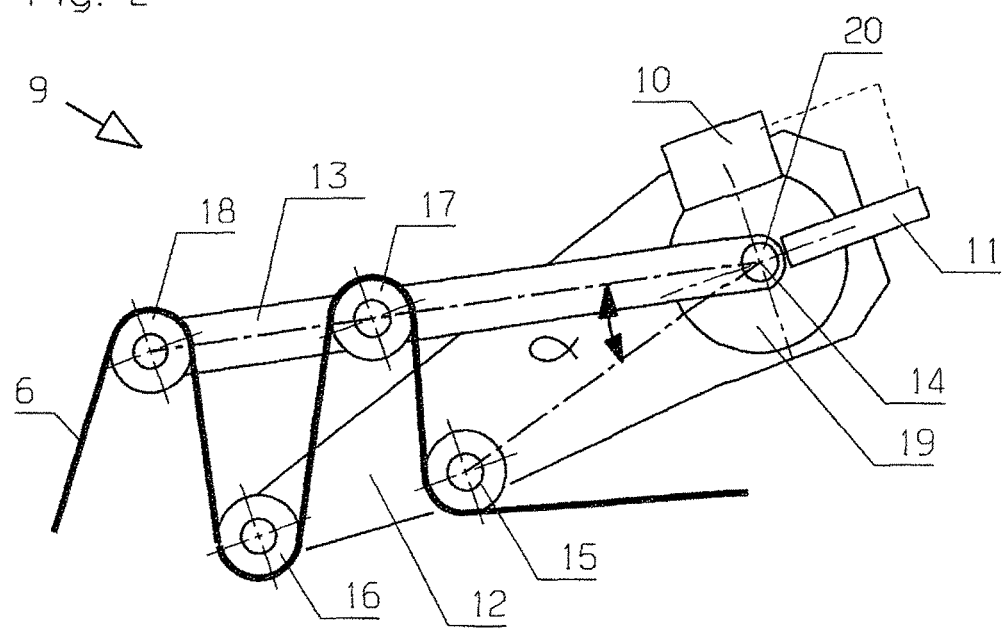
Fig: 2

APPARATUS FOR MANUFACTURING COIL SCREENS

CROSS-REFERENCE TO RELATED APPLICATIONS

The present application claims priority under 35 U.S.C. § 119 of European Patent Application No. 14 177 388.7 filed Jul. 17, 2014, the disclosure of which is expressly incorporated by reference herein in its entirety.

BACKGROUND OF THE EMBODIMENTS

1. Field of the Invention

The invention relates to an apparatus for manufacturing coil screens with at least one winding device, arranged above a working surface, for the production of coils and a depositing device with which the coils can be deposited on the working surface.

2. Discussion of Background Information

In the production of what are referred to as spiral screens, coils of helically wound plastic wires are deposited next to one another on a working surface and brought into engagement with one another. A fixing wire made of plastic is then inserted in the region of overlap between adjacent coils. The coils connected to one another in such a manner are typically moved transverse to their longitudinal direction by at least one coil width in order to make room for additional coils.

An apparatus of the type named at the outset is known, e.g., from DE 10 2007 052 594 B4 and its family member U.S. Patent Publication No. 2010/0287775, the disclosures of which are expressly incorporated by reference herein it their entireties. In this known apparatus, a winding device is arranged above the working surface in order to produce the coils on the spot, as it were. In this manner, a multi-stage process is avoided in which the coils must first be produced and then stored intermediately before they can be removed from the intermediate storage and deposited on the working surface. This two-stage method involves a considerable risk in that the coils can become knotted or entangled with one another, which hinders the removal from the intermediate storage and can cause damage.

In the known apparatus from DE 10 2007 052 594 B4 and its family member U.S. Patent Publication No. 2010/0287775, the depositing device is moved together with the winding device over the working surface and a length of one coil is thereby deposited on the working surface. The winding device is subsequently moved back to the starting point again with the depositing device, in order to produce the next coil and deposit it on the working surface. It is also possible to simultaneously use multiple winding devices and move them over the working surface. During the return movement of the winding device to the starting point, the depositing process is interrupted. A synchronous interruption of the coil production is, in terms of process technology, virtually impossible and would result in a considerable loss in quality of the coils produced. However, the quality of a coil screen made up of the coils depends, among other things, on the quality of the coils produced.

SUMMARY OF THE EMBODIMENTS

Embodiments of the invention ensure a high quality of the coil screen.

Accordingly, for an apparatus of the type named at the outset includes a storage device is arranged downstream from the winding device.

In embodiments of the apparatus, the coils can be produced in the location where they are later needed for the production of a coil screen, i.e., above the working surface. If the depositing device is moved over the working surface, then the coils can be deposited on the working surface over their entire length. If necessary, the winding device can also be moved together with the depositing device. During the return movement of the depositing device to the starting point, the winding device is nevertheless able to keep operating, i.e., continue producing a coil, so that the production of the coils can occur continuously, as it were. Even if the return movement of the depositing device to the starting point for the next coil occurs at an increased speed after a successful deposit of a coil, it is not possible for a coil to be deposited on the working surface during the interval of the return movement. However, this is not necessary, since the coil length produced in this interval can be received by the storage device. Thus, the storage device is filled during the return movement and emptied during the movement of the depositing device, during which the coil is deposited on the working surface.

Preferably, the storage device is arranged between the winding device and the depositing device. This location is ideal for decoupling from one another the depositing by means of the depositing device and the winding by means of the winding device.

Preferably, the storage device comprises a fill-level sensor. With the aid of the fill-level sensor, it is possible to determine a degree of utilization of the storage device and to further process this information in a control device. The control device can, e.g., control the speed at which the depositing device is moved over the working width.

Preferably, the storage device can be operated using a preselectable tension. With this mechanical tension, the coil produced by the winding device can be kept taut, i.e., both during the depositing and also during the storage. Thus, the storage device is embodied or formed as a pass-through storage in which the coil is fed at one end and removed at the other end. Because the coil is kept under mechanical tension, defined conditions can be achieved during the depositing of the coil on the working surface. In addition, as a result of the mechanical tension, there is virtually no risk of the coil becoming knotted or tangled in any way.

Preferably, the tension is nearly constant across the degree of utilization of the storage device. However, it is noted that the term "nearly constant" does not refer to constancy in a narrower mathematical sense. Instead, this term should be understood to mean that that a preselected mechanical tension is ensured and maintained within in a predetermined range, so that the tension only changes to a tolerable extent, e.g., by no more than 20%. Among other things, this tension depends on the shape and material of the plastic coils.

Preferably, the storage device comprises two levers that can be pivoted relative to one another about a common pivot axis. Further, via at least one diversion device arranged on each lever, the coil can be guided. Depending on an angular position of the levers relative to one another, the diversion devices have a smaller or greater distance to one another. This distance determines the length of the coil that is received in the storage device. Preferably, at least three diversion devices will be used, of which two are arranged on one lever and one is arranged on the other lever. Of course, more diversion devices are also possible. The diversion devices are preferably embodied or formed as diversion rollers. Thus, if the storage device must receive a greater length of the coil, then the levers are pivoted away from one another. If the degree of utilization of the storage device is to decrease, then an angle between the levers is reduced.

Preferably, the levers are connected to a pretensioning device which pretensions or biases the levers in an opening direction. The pretensioning device then defines the mechanical tension with which the storage device acts on the coil.

In embodiments, it is preferred that the pretensioning device is embodied or formed as a rotating magnet. A rotating magnet generates torque by way of a magnet. In this manner, a torque which is constant within certain limits can be produced over a certain angle range, so that the levers can be pressed or driven apart from one another using this torque.

Preferably, the rotating magnet is embodied or formed as an electromagnet which is connected to a current control device. With the aid of the current control device, a corresponding torque can be generated. By way of the current control, the magnitude of this torque can be adjusted. The electromagnet can be embodied or formed so that it generates a constant or virtually constant torque over the pivot range of the levers.

Preferably, an angle sensor is provided which detects an angular position of the levers relative to one another. This angle sensor can be used as a fill-level sensor. The angular position of the two levers relative to one another provides a clear indication as to which length of the coil is received in the storage device.

In embodiments, it is preferred that the angle sensor is either integrated in the pretensioning device or connected to the pretensioning device. In this way, the required installation space is kept small, and the number of parts that must be operated is kept at a reasonable level.

Embodiments of the invention are directed to an apparatus for manufacturing coil screens. The apparatus includes at least one winding device, arranged above a working surface, that is structured for producing coils; a depositing device structured and arranged to deposit the coils on the working surface; and a storage device arranged, with respect to a depositing direction of the coils, downstream from the at least one winding device.

In embodiments, the storage device can be arranged between the winding device and the depositing device.

According to embodiments, the storage device can include a fill-level sensor.

In accordance with other embodiments, the storage device may be operable with a preselectable tension. The preselected tension can be nearly constant across a degree of utilization of the storage device.

Moreover, in other embodiments, the storage device may include: two levers pivotable relative to one another about a common pivot axis, and at least one diversion device arranged on each lever to guide the coils. The storage device can further include a pretensioning device structured and arranged to be connected to the two levers and to pretension the two levers in an opening direction. The pretensioning device can also include a rotating magnet. Further, the rotating magnet can include an electromagnet connected to a current control device. Further still, the storage device can also include an angle sensor that detects an angular position of the two levers relative to one another. The angle sensor may be one of integrated in the pretensioning device or connected to the pretensioning device.

Embodiments of the invention are directed to a method for manufacturing coil screens. The method includes winding a wire above a working surface to produce a coil; depositing at least a part of the produced coil onto the working surface; and storing a portion of the produced coil under tension before the at least a part of the produced coil is deposited onto the working surface In embodiments, the wire can be wound in a winding device, the at least a part of the produced coil may be deposited onto the working surface by a depositing device, and the portion of the produced coil stored under tension can be stored in a storage device arranged, with respect to a depositing direction, downstream of the winding device. The method can also include feeding a wire to the winding device.

According to other embodiments, the storing of the portion of the produced coil may include guiding the portion of the produced coil in a serpentine manner between rollers mounted on two levers connected at a common pivot axis. The method can also include pretensioning the two levers at the common pivot axis in a direction to increase between the two levers. The two levers may be pretensioned by an electromagnet and the method can further include supplying current to the electromagnet to adjust a torque at the common pivot axis. Further, the method can include monitoring an angle between the two levers at the common pivot axis. The method may also include controlling the angle between the two levers at the common pivot axis.

In accordance with still yet other embodiments of the present invention, the method may further include adjusting the tension under which the portion of the produced coil is stored.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 shows a schematic representation of an apparatus for manufacturing coil screens; and FIG. 2 shows a schematic representation of a storage device

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1 shows, in a highly schematic illustration, an apparatus 1 for manufacturing coil screens with a working surface 2 and a winding device 3. Winding device 3 draws a plastic wire 4, e.g., a plastic monofilament, off of a spool 5 and produces therefrom a coil 6, which is deposited on working surface 2 via a depositing device 7. To render this possible, winding device 3 can be moved together with depositing device 7 on a portal 8. A drive provided for this purpose is not illustrated in greater detail.

However, it is be understood that it is also possible to move only depositing device 7 over working surface 2 and to keep winding device 3 stationary or to move winding device 3 relative to the working surface at a different speed than depositing device 7.

In the exemplary embodiment, depositing device 7 deposits the coil 6 from the left side of working surface 2 to the right side of working surface 2. Coil 6 is then severed. Depositing device 7 can then move back to the left side of working surface 2 from the right side of working surface 2, in order to repeat the depositing process of depositing another coil 6 onto working surface 2.

During this return travel movement of depositing device 7, while a coil 6 is not deposited onto working surface 2, winding device 3 continues to operate and produce coil 6. In this way, winding device 3 can be understood to operate continuously to continually produce coil 6.

However, because no coils 6 can be deposited on working surface 2 during the return travel movement, a storage device 9 is provided between winding device 3 and depositing device 7. During the return travel movement, storage device 9 receives a length of coil 6 that is produced by winding device 3 during the interval of the return travel movement. During the subsequent depositing of coil 6 onto working surface 2, storage device 9 is then fully or partially emptied again.

As storage device 9 is arranged between winding device 3 and the depositing device 7, the operation of winding device 3 can be decoupled from the operation of depositing device 7.

Storage device 9 acts on coil 6 with a preselectable tension. This mechanical tension can be adjusted via a control device 10 that is connected to storage device 9 by lines not illustrated in detail. Storage device 9 can also include a fill-level sensor 11 that can likewise be connected to control device 10. Control device 10 may also control the movement of depositing device 7, and if necessary, the movement of winding device 3, over working surface 2. Fill-level sensor 11 will be further explained below by way of example.

The mechanical tension with which storage device 9 acts on the coil 6 is essentially constant in that it changes by less than 20% across a degree of utilization of storage device 9.

FIG. 2 shows the structure of storage device 9 in a highly schematic form.

In the illustrated embodiment, coil 6 is merely illustrated by a solid line. Storage device 9 can include two levers 12, 13, which can be pivoted relative to one another about a common pivot axis 14. Two diversion rollers 15, 16 are rotatably arranged on lever 12 and two diversion rollers 17, 18 are rotatably arranged on lever 13. Coil 6, which is formed by winding device 3, is guided via diversion roller 15 on first lever 12, via diversion roller 17 on second lever 13, via diversion roller 16 on first lever 12 and via diversion roller 18 on second lever 13, before it reaches depositing device 7. It is understood that coil 6 can be guided in a different manner via diversion rollers 18, 16, 17, 15, as long as it is ensured that this guidance includes at least one section of coil 6 that is arranged between diversion rollers on different levers 12, 13.

Levers 12, 13 are connected to a pretensioning device 19 that pretensions or biases levers 12, 13 in an opening direction, i.e., in a direction in which an angle α between levers 12, 13 would increase.

This can be achieved, e.g., in embodiments in which pretensioning device 19 is non-rotatably connected rotatably to one lever, such as lever 12, and acts on the other lever, such as lever 13, via a shaft 20 that is loaded with a predetermined torque.

Pretensioning device 19 can be embodied or formed as a rotating magnet, and preferably as an electromagnet that can be supplied with a preselectable current via control device 10. In such embodiments, control device 10 can be understood to additionally function as a current control device. Using the strength of the current, a magnitude of the torque produced on shaft 20 by the electromagnet can also be adjusted, whereby the mechanical tension with which storage device 9 acts on coil 6 can be adjusted. The electromagnet is particularly capable of keeping or maintaining a constant torque constant within the scope of the limit of the embodiments, as described above.

In embodiments, fill-level sensor 11 can be embodied or formed as an angle sensor to detect the angular position, i.e., the angle α between levers 12, 13 at pivot axis 14. The angle sensor can be integrated into pretensioning device 19 or it can be connected to pretensioning device 19.

The angle sensor can also be connected to control device 10. In this way, if it is desired to keep the change in the torque produced by pretensioning device 19 even smaller, another approach can be to store a characteristic curve of the rotating magnet in control device 10 and for control device 10 to feed a current to the electromagnet that constitutes pretensioning device 19. In this way, the current produces precisely the desired torque for the angle which is currently present and detected by the angle sensor.

With the illustrated apparatus, three sub functions can be simultaneously carried out. In this regard, the continuously produced coils 6 can be stored during the time interval for the movement of depositing device 7, possibly with winding device 3, from the end of the deposited working width back to the start for a subsequent coil deposit. Further, a defined and constant coil tension can be maintained independently of the fill level of storage device 9. Still further, the fill level of storage device 9 can be continuously measured by the angle sensor so that data is available for the synchronization of the coil-production speed and the coil-deposit speed.

By applying a torque at shaft 20 of pretensioning device 19, which is selectable and constant within certain limits, a defined mechanical longitudinal tension of coil 6 and of storage device 9 is produced, and an uncontrolled movement of coil 6 is thus eliminated. Thus, it is virtually impossible for a knotting to occur.

If, while coil 6 is under constant tension, more coil 6 is fed to storage device 9 than is drawn off from storage device 9, the angle α between levers 12, 13 can be increased, whereby the distance between opposing diversion rollers 15, 17; 16, 18 and therefore the length of coil 6 present in storage device 9 also increases. However, in the event of a higher drawing speed relative to feeding speed, levers 12, 13 can be pivoted towards one another again.

Thus, by measuring the pivoting angle movement of shaft 20 while maintained under constant torque, an increase and a decrease in the length of coil 6 located in storage device 9 can be determined, which can then be used as a control signal for the synchronization of the depositing speed.

By infusing a preselectable current strength in the electromagnet used as pretensioning device 19, a torque proportional to the current is produced which remains approximately constant over the entire angle movement range independent of the angle α.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. An apparatus for manufacturing coil screens comprising:
   at least one winding device, arranged above a working surface, that is structured for producing coils;
   a depositing device structured and arranged to deposit the coils on the working surface;
   a storage device arranged, with respect to a depositing direction of the coils, downstream from the at least one winding device; and
   said storage device being configured to receive a length of coil produced by the winding device during a return travel movement of the depositing device,
   wherein during said return travel movement of the depositing device no coils are deposited on the working surface, and
   wherein the storage device comprises;
      two levers that pivot relative to one another about a common pivot axis, and
      at least one diversion device arranged on each lever to guide the coils.

2. The apparatus according to claim 1, wherein the storage device is arranged between the winding device and the depositing device.

3. The apparatus according to claim 1, wherein the storage device comprises a fill-level sensor.

4. The apparatus according to claim 1, wherein the storage device is operable with a preselectable tension.

5. The apparatus according to claim 4, wherein the preselected tension is nearly constant across a degree of utilization of the storage device.

6. The apparatus according to claim 1, wherein the storage device further comprises a pretensioning device structured and arranged to be connected to the two levers and to pretension the two levers in an opening direction.

7. The apparatus according to claim 6, wherein the pretensioning device comprises a rotating magnet.

8. The apparatus according to claim 7, wherein the rotating magnet comprises an electromagnet connected to a current control device.

9. The apparatus according to claim 1, wherein the storage device further comprises an angle sensor that detects an angular position of the two levers relative to one another.

10. The apparatus according to claim 9, wherein the angle sensor is one of integrated in a pretensioning device or connected to a pretensioning device.

11. A method for manufacturing coil screens using the apparatus of claim 1, comprising:
    winding a wire above the working surface to produce a coil;
    depositing at least a part of the produced coil onto the working surface; and
    storing a portion of the produced coil under tension before the at least a part of the produced coil is deposited onto the working surface.

12. The method according to claim 11, wherein the wire is wound in the winding device, the at least a part of the produced coil is deposited onto the working surface by the depositing device, and the portion of the produced coil stored under tension is stored in the storage device.

13. The method according to claim 12, further comprising feeding a wire to the winding device.

14. The method according to claim 11, wherein the storing of the portion of the produced coil comprises guiding the portion of the produced coil in a serpentine manner between rollers mounted on the two levers connected at a common pivot axis.

15. The method according to claim 14, further comprising pretensioning the two levers at the common pivot axis in a direction to increase between the two levers.

16. The method according to claim 15, wherein the two levers are pretensioned by an electromagnet and the method further comprises supplying current to the electromagnet to adjust a torque at the common pivot axis.

17. The method according to claim 15, further comprising monitoring an angle between the two levers at the common pivot axis.

18. The method according to claim 17, further comprising controlling the angle between the two levers at the common pivot axis.

19. The method according to claim 11, further comprising adjusting the tension under which the portion of the produced coil is stored.

20. An apparatus for manufacturing coil screens comprising:
    at least one winding device, arranged above a working surface, that is structured for producing coils;
    a depositing device structured and arranged to deposit the coils on the working surface;
    a storage device arranged upstream of the depositing device and downstream of the at least one winding device,
    wherein during a return travel movement of the depositing device no coils are deposited on the working surface, and
    wherein the storage device comprises plural coil guiding rollers configured to receive a length of coil produced by the winding device during a return travel movement of the depositing device.

21. The apparatus according to claim 20, wherein the coil guiding rollers move away from each other when accommodating a greater length of coil and closer to each other when accommodating a lesser length of coil.

22. An apparatus for manufacturing coil screens comprising:
    at least one winding device, arranged above a working surface, that is structured for producing coils;
    a depositing device structured and arranged to deposit the coils on the working surface;
    a storage device arranged, with respect to a depositing direction of the coils, downstream from the at least one winding device; and
    said storage device being configured to receive a length of coil produced by the winding device during a return travel movement of the depositing device, wherein during said return travel movement of the depositing device no coils are deposited on the working surface,
wherein the storage device either fully or partially discharges a portion of the length of coil when the coils are deposited on the working surface, and
wherein during said return travel movement of the depositing device, the apparatus is configured such that the winding device continues to produce coils.

\* \* \* \* \*